United States Patent
Mase et al.

(10) Patent No.: US 10,641,681 B2
(45) Date of Patent: *May 5, 2020

(54) STRUCTURE ABNORMALITY DETECTION SYSTEM, STRUCTURE ABNORMALITY DETECTION METHOD, AND STORAGE MEDIUM

(71) Applicant: NEC CORPORATION, Tokyo (JP)

(72) Inventors: Ryota Mase, Tokyo (JP); Katsuhiro Ochiai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 155 days.

This patent is subject to a terminal disclaimer.

(21) Appl. No.: 15/767,881

(22) PCT Filed: Oct. 7, 2016

(86) PCT No.: PCT/JP2016/004525
§ 371 (c)(1),
(2) Date: Apr. 12, 2018

(87) PCT Pub. No.: WO2017/064855
PCT Pub. Date: Apr. 20, 2017

(65) Prior Publication Data
US 2018/0306669 A1    Oct. 25, 2018

(30) Foreign Application Priority Data

Oct. 13, 2015 (JP) ................ 2015-202076

(51) Int. Cl.
*G01M 7/02* (2006.01)
*G01M 5/00* (2006.01)

(52) U.S. Cl.
CPC .......... *G01M 7/025* (2013.01); *G01M 5/0008* (2013.01); *G01M 5/0033* (2013.01); *G01M 5/0066* (2013.01); *G01M 7/022* (2013.01)

(58) Field of Classification Search
CPC ............ G01M 5/0008; G01M 5/0066; G01M 5/0033; G01M 7/025; G01M 7/022
(Continued)

(56) References Cited

U.S. PATENT DOCUMENTS

| | | | |
|---|---|---|---|
| 6,370,964 B1 * | 4/2002 | Chang ............... | G01B 5/30 73/862.046 |
| 2009/0002011 A1 * | 1/2009 | Tanaka ............... | G01R 31/2891 324/762.02 |

(Continued)

FOREIGN PATENT DOCUMENTS

| | | |
|---|---|---|
| JP | 7-128182 A | 5/1995 |
| JP | 2013-40774 A | 2/2013 |
| WO | 2015/033603 A1 | 3/2015 |

OTHER PUBLICATIONS

International Search Report for PCT/JP2016/004525 dated Dec. 13, 2016 [PCT/ISA/210].

*Primary Examiner* — Jacques M Saint Surin
(74) *Attorney, Agent, or Firm* — Sughrue Mion, PLLC

(57) ABSTRACT

A structure abnormality detection system that detects an abnormality of at least one of structures classified into a plurality of groups in which a plurality of factors that may affect behavior of structures are substantially the same includes: means for storing a model that predicts, from a first inspection value acquired at a first inspection position, a second inspection value acquired at a second inspection position that is a position where a vibration intensity in vibration of a predetermined vibration mode at a natural frequency of the structure is substantially the same as at the first inspection position; and means for detecting an abnormality of the structure by evaluating fidelity of the first inspection value and the second inspection value acquired at a particular time to the model.

10 Claims, 7 Drawing Sheets

(58) Field of Classification Search
USPC .......................................................... 73/570
See application file for complete search history.

(56) References Cited

U.S. PATENT DOCUMENTS

| | | | | |
|---|---|---|---|---|
| 2012/0303556 A1* | 11/2012 | Lin | ..................... | G01S 5/0252 |
| | | | | 706/12 |
| 2016/0155026 A1* | 6/2016 | Hashiguchi | .......... | G06K 9/6267 |
| 2016/0196175 A1* | 7/2016 | Kasahara | ............ | G06F 11/0751 |
| | | | | 714/49 |
| 2018/0190378 A1* | 7/2018 | Takei | ..................... | G16H 40/40 |

* cited by examiner

STRUCTURE ABNORMALITY DETECTION SYSTEM, STRUCTURE ABNORMALITY DETECTION METHOD, AND STORAGE MEDIUM

CROSS REFERENCE TO RELATED APPLICATIONS

This application is a National Stage of International Application No. PCT/JP2016/004525, filed on Oct. 7, 2016, which claims priority from Japanese Patent Application No. 2015-202076, filed on Oct. 13, 2015.

TECHNICAL FIELD

The present invention relates to a structure abnormality detection system, a structure abnormality detection method, and a storage medium.

BACKGROUND ART

There is a demand for non-destructive detection of deterioration or abnormality occurring in a structure such as a building. For example, in inspection of a bridge as a structure, an inspector visits an inspecting road on the bridge, performs detection of an abnormality by visual inspection, hammering sound inspection (contact inspection), or the like and identifies a part to be repaired with priority. In such contact inspection, an abnormality is determined relying on a sound that the inspector listens to, and thus an abnormality cannot be determined quantitatively. Such contact inspection is labor-intensive resulting in a low work efficiency and tends to cause increased cost.

In general, in a structure abnormality detection system, measuring devices such as, typically, accelerometers are regularly arranged in a structure, the vibration mode is derived from the measuring results obtained when a local vibration is given to the structure, the degree of a change is calculated from the vibration mode obtained when the structure is normal, and thereby an abnormality of each structure is determined.

SUMMARY OF INVENTION

In the conventional abnormality detection system, however, no abnormality can be detected unless conceivable patterns of abnormalities for a case where abnormalities are in a plurality of parts have been modelled in advance. Further, there is a problem of being unable to identify the abnormal part.

There is a demand for a structure abnormality detection device and a structure abnormality detection method having a configuration of utilizing a relationship of inspection information among a plurality of positions to detect an abnormality in a structure.

Furthermore, there is a demand for a structure abnormality detection system and a structure abnormality detection method that detect an abnormality of a plurality of structures located in difference places rather than detect an abnormality of a single structure.

Thus, an example object of the present invention is to provide a structure abnormality detection system, a structure abnormality detection method, and a storage medium that can increase the efficiency of inspection of an infrastructure to reduce cost in accordance with inspection information from a plurality of positions.

In order to achieve the example object described above, provided is a structure abnormality detection system that detects an abnormality of at least one of structures classified into a plurality of groups in which a plurality of factors that may affect behavior of the structures are substantially the same. The structure abnormality detection system includes: a structure abnormality detection device that comprises means for storing a model that predicts, from a first inspection value acquired at a first inspection position, a second inspection value acquired at a second inspection position that is a position where a vibration intensity in vibration of a predetermined vibration mode at a natural frequency of the structure is substantially the same as at the first inspection position, and means for detecting an abnormality of the structure by evaluating fidelity of the first inspection value and the second inspection value acquired at a particular time to the model; and a control unit that identifies that an abnormality occurs in a structure in the group by evaluating fidelity of an inspection value of a first structure and an inspection value of a second structure at a particular time to the prediction model based on determination made by the structure abnormality detection device.

In order to achieve the example object described above, provided is a structure abnormality detection method for detecting an abnormality of at least one of structures classified into a plurality of groups in which a plurality of factors that may affect behavior of the structures are substantially the same. The structure abnormality detection method includes steps of: in a relation among all the normal structures in each of the groups, pre-storing a model for each of the groups that predicts a second inspection value in a second structure from a first inspection value in a first structure; and identifying an abnormality occurs in a structure in the group by evaluating fidelity of an inspection value in the first structure and an inspection value of the second structure at a particular time to the model.

In order to achieve the example object described above, provided is a storage medium storing a structure abnormality detection program that is able to cause a computer device to implement following functions and detects an abnormality of at least one of structures classified into a plurality of groups in which a plurality of factors that may affect behavior of the structures are substantially the same. The structure abnormality detection program includes functions of: in a relation among all the normal structures in each of the groups, based on vibration data obtained in at least one inspection position of the structure, pre-storing a model for each of the groups, wherein the model predicts, from a first inspection value acquired at a first inspection position, a second inspection value acquired at a second inspection position that is a position where a vibration intensity in vibration of a predetermined vibration mode at a natural frequency of the structure is substantially the same as at the first inspection position; and identifying an abnormality occurs in a structure in the group by evaluating fidelity of an inspection value in the first structure and an inspection value in the second structure at a particular time to the model.

In order to achieve the example object described above, provided is a structure abnormality detection system including: sensors arranged in bridges to acquire vibration data, wherein the bridges are classified into a plurality of groups in which a plurality of factors that may affect behavior of structures are substantially the same; storage that stores vibration data acquired by the sensors; and a structure abnormality detection device, wherein an abnormality of the bridges is detected in accordance with the vibration data at a plurality of positions of the bridges in the groups obtained by the sensors.

According to the present invention, the efficiency of abnormality inspection of a plurality of structures located in a wide area can be increased allowing for cost reduction.

DESCRIPTION OF EMBODIMENTS

In the present specification, "structure" refers to an architecture that is constructed with concrete, such as a building, a house, a bridge, or the like, for example. Note that a structure may be a pipe of a pipeline or water supply and sewerage. Furthermore, a structure may be a structure constructed with a metal (for example, a railroad bridge, a machine such as a heavy machine and a construction machine). Further, "abnormality" occurring in a structure may include occurrence of a crack, a dropout of a bolt, a fissure, a free lime, or the like.

Further, in each embodiment described below, the vibration propagating in a bridge is given from a vehicle traveling on the bridge. However, vibration propagating in a structure such as a bridge can also be applied to the structure by using excitation means provided to a structure abnormality detection device. When vibration caused by vehicles is utilized, in general, since a plurality of vehicles having different weights pass by sensors, amplitudes of the vibration propagating in a structure may vary. Thus, the structure abnormality detection device can obtain resonance state information on multiple types of vibration.

Respective example embodiments to which the present invention is applied will be described below specifically with reference to the attached drawings. The example embodiments illustrated below will be described as examples and of course does not limit the present invention.

Figure 1:
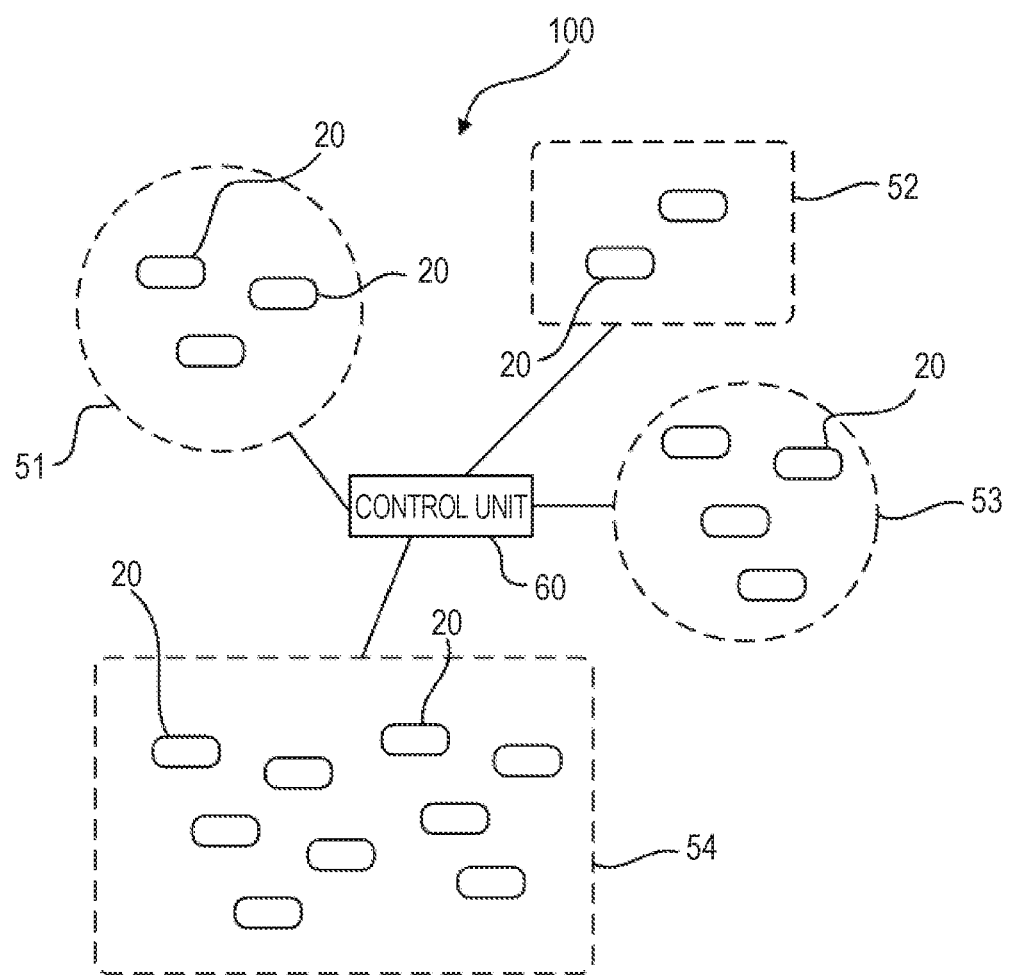
FIG. 1 is a schematic diagram illustrating a structure abnormality inspection system of the present invention.

FIG. 1 is a schematic diagram illustrating a structure abnormality detection system 100 of the present invention. In this example, bridges are illustrated as structures as an example. Each of the plurality of groups 51 to 54 includes at least one bridge 20 as a structure in which a plurality of factors that may affect the behavior of the bridge 20, for example, environmental conditions such as a temperature, a humidity, a material, or the like are substantially the same. In the relationship among all the normal bridges 20 within each group, a model that predicts, from an inspection value of one bridge 20, an inspection value of another bridge 20 is derived and pre-stored for each group. A fidelity to the model of an inspection value at a particular time is evaluated, and thereby the bridge 20 in which an abnormality occurs is detected in a plurality of bridges. When structures having substantially the same environmental conditions are unknown, models that predict, from the inspection value of one bridge, the inspection value of another bridge are derived for combinations for all the bridges, and bridges having high correlation may be grouped.

Each of the groups 51 to 54 is connected to a control unit 60. This connection may be wired or wireless or via the internet. The control unit 60 detects an abnormality based on data from each of the groups 51 to 54 and identifies in which bridge 20 of which group the abnormality occurs.

The number of bridges 20 included in each of the groups 51 to 54 may be one or more. Further, the bridges 20 may be geographically close to each other or far from each other. Any combinations of bridges are possible as long as the bridges have substantially the same environmental conditions. Furthermore, in each of the groups 51 to 54, the structure is not limited to a bridge but may be combined with other structures.

Abnormality detection of the individual bridge 20 is performed based on a structure abnormality detection device described in first to fourth example embodiments illustrated below. Detection information and vibration data from each of the groups 51 to 54 are accumulated in storage (not shown) on a cloud in real time, and a group having an abnormality and a bridge having an abnormality in the group can be identified based on the data.

It is possible to regard each of the groups 51 to 54 as one structure, compare models in a normal state of all the groups among groups whose environmental conditions such as a temperature, a humidity, a material, or the like are expected to substantially the same, and determine an abnormality in the entire groups.

Figure 2:
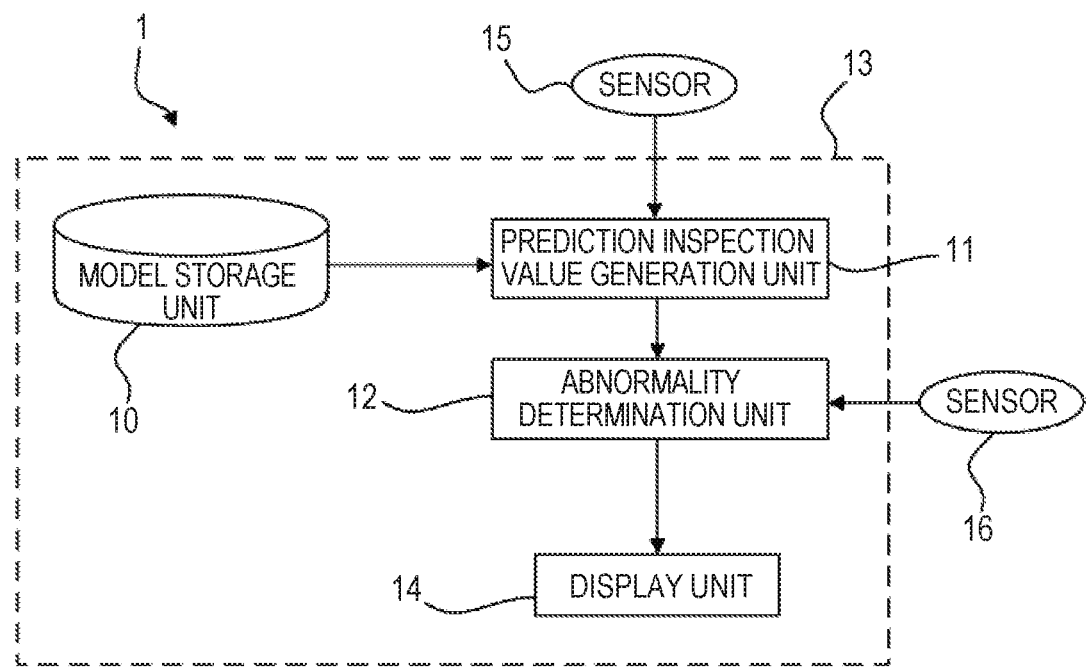
FIG. 2 is a block diagram illustrating a functional configuration of a structure abnormality detection device that detects an abnormality of a structure.

The configuration and the operation of each of the structure abnormality detection devices in the structure abnormality detection system of the present invention will be described below. FIG. 2 is a block diagram illustrating a functional configuration of a structure abnormality detection device that is used in each example embodiment described below and detects an abnormality of a structure.

In FIG. 2, the structure abnormality detection device 1 (hereafter, referred to as "abnormality detection device") includes a model storage unit 10 that stores a model created in advance through prediction from a plurality of inspection values, a prediction inspection value generation unit 11, an abnormality determination unit 12, and a display unit that displays the presence or absence of an abnormality.

The prediction inspection generation unit 11 generates a prediction inspection value of a second inspection value from a first inspection value sensed by a sensor 15 and acquired at a first inspection position. The second inspection value is an inspection value acquired at a second inspection position that is a position at which the vibration intensity in vibration of a predetermined vibration mode is the same degree as that of the first inspection position at the natural frequency of a building. Further, the abnormality determination unit 12 compares a prediction inspection value at the second inspection position obtained by the prediction inspection value generation unit 11 with an inspection value measured by a sensor at the second inspection position, evaluates the fidelity to a model, and determines the presence or absence of an abnormality. The abnormality determination unit 12 can determine not only the presence or absence of an abnormality but also the degree of the abnormality.

Information from the abnormality determination unit 12 is displayed on the display unit 14. When an abnormality is found, the display unit 14 may output a repair instruction. Further, a unit 13 includes the model storage unit 10, the prediction inspection value generation unit 11, the abnormality determination unit 12, and the display unit 14 and has a storage medium (not shown) that stores a structure abnormality detection program. The unit 13 can use the storage medium and at least one computer as the structure abnormality detection program to perform each of the functions described above. In this case, a part or the whole thereof can be implemented in a cloud. A hard disk, an optical disk, a magneto-optical disk, a CD-ROM, a magnetic tape, a non-volatile memory card, or a ROM may be used as a storage medium, for example.

Figure 3:
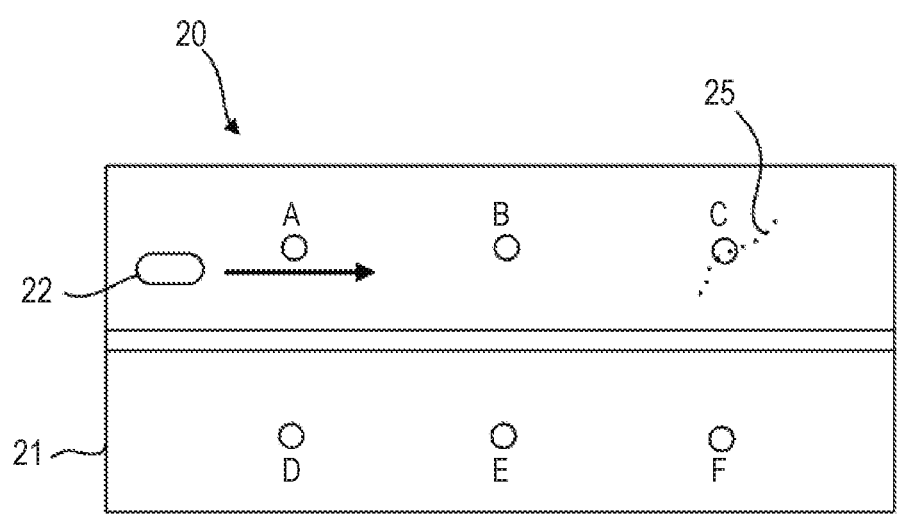
FIG. 3 is a schematic diagram illustrating a relationship among the road surface (floorboard) of a bridge, a vehicle traveling thereon, and sensors in a first example embodiment.

FIG. 3 is a schematic diagram illustrating a relationship among the road surface (floorboard) of a bridge as a structure, a vehicle traveling thereon, and sensors. A vehicle 22 travels in the arrow direction on a floorboard 21 forming a road surface of a bridge 20. A plurality of sensors A to F that sense vibration are provided on the floorboard 21 at a plurality of inspection positions by which the vehicle 22 passes. Storage (not shown) that stores vibration data acquired by the sensors may be provided. A structure abnormality detection system can be constructed by combining the sensors A to F, the storage, and the structure abnormality detection device 1.

For the sensors A to F, a vibration sensor that measures a vibration acceleration, a displacement sensor that measures a displacement, a distortion sensor that measures distortion, or an acoustic sensor that measures a sound may be used. It is preferable for the sensors A to F to be arranged on the backside of the floorboard where a change due to vibration is easily detected. This is because the sensors are less affected by vehicles. Further, the sensors may be those perform sensing from a distant place by ranging using a laser or by photographing using a camera without being arranged directly on the bridge 20. Furthermore, a sensor that senses information on the external environment represented by a temperature, a humidity, or a wind velocity of the periphery of the bridge 20, information on the temperature of a road surface, or the like may be included.

First Example Embodiment

A first example embodiment of the present invention will be described below. When a structure is normal, temporal data of vibration acquired by the plurality of sensors A to F illustrated in FIG. 2 is converted into frequency data, and a model predicted from a correlation of the frequency data of each sensor is generated. It is preferable that sensors used in the first example embodiment be vibration sensors or displacement sensors. While the temporal data is data in which waves having different frequencies overlap with each other including a phase shift, the influence of the phase can be removed by the frequency conversion.

Here, generation of the model will be described. A relational expression (prediction expression) for predicting the value of the sensor B from the value of the sensor A is calculated. In modeling, with time delay of data from each sensor being taken into consideration, data of the sensor A and data of the sensor B are divided into a small unit data, respectively, a regression model is used to predict the value of the sensor B from the value of the sensor A or the value of the sensor A from the value of the sensor B on a small unit basis, the optimum value is calculated exploratory in a least-square method for a coefficient in the prediction, and the coefficient having the largest correlation is employed. The relational expression can be calculated by other methods than the above.

When the correlation obtained from the calculated relational expression is greater than or equal to a predetermined value, it is determined that such a pair of sensors have a high correlation. Alternatively, this correlation can also be defined in prediction of the value of the sensor A from the value of the sensor B, and it may be determined that the correlation is high when the correlation in predicting the value of the sensor B from the value of the sensor A and the correlation in predicting the value of the sensor A from the value of the sensor B are greater than or equal to a predetermined value, respectively. Note that the correlation here may be such an index that a smaller difference between a measurement value and a prediction value results in a larger index, which may be a sum of the absolute values or squares of the differences, a reciprocal number the average of the differences, or other indexes. In the model generation, only the pairs of sensors having a high correlation may be modelled or all the pairs of sensors may be modelled.

In this example, the correlation is determined from a difference between the value predicted using the generated model and the measurement value, and the presence or absence of an abnormality is determined. When the absolute value of the difference between the measurement value and the prediction value at any time exceeds the maximum value of the absolute value of the difference between the prediction value and the measurement value when modelled, it may be determined that an abnormality occurs. Alternatively, in taking the error in modelling into consideration, an abnormality may be determined when a value resulted by multiplying the maximum value by a constant coefficient is exceeded. Further, when an event causing the difference between the measurement value and the prediction value satisfying the above condition singly at a particular time, the likelihood of an abnormality occurring may be low. Thus, an average of differences from close times is taken and the average is greater than or equal to a predetermined value, it may be determined that an abnormality occurs. Other methods than the above may be used to detect an abnormality. When it is determined that abnormalities occur at a plurality of sensor positions, it may be determined that the abnormality degree is higher at the sensor which belongs to more pairs whose difference from the prediction value is greater than or equal to the predetermined value.

The correlation of frequency conversion data will now be described. For each temporal data, data for a certain time period from the time when the amplitude thereof is the largest to the time when the amplitude sufficiently attenuates (a time period from the time when a vehicle passes through a certain point to the time when the influence of vibration is no longer applied by the vehicle on the point, namely, around several seconds practically) is frequency-converted, and abnormality detection utilizing the correlation of the frequency conversion data is performed. That is, in FIG. 3, data can be acquired only after the vehicle starts passing by the sensor A and then finishes passing by the sensor C, which enables comparison between these sensors. Also in modelling, when the bridge 20 is normal, modelling is made by using frequency conversion data of the sensor A to the sensor C obtained after the vehicle 22, which is a vibration source, passes by the sensor A and finishes passing by the sensor C. Such a process is performed in a similar manner also in abnormal detection.

In order to achieve the process as described above, when the points of the largest amplitude occur with a slight time difference in the temporal data of adjacent sensors, it is determined that these points are subjected to the influence of vibration application from the same vibration source, and a process of searching for the point having the largest amplitude and cutting out a signal for a certain time period therefrom is performed. Then, frequency conversion is performed on the signal of the cut out section.

When a structure is abnormal, it is considered that vibration characteristics may change, and the change in the vibration characteristics can be detected in a timely manner. In other words, it is possible to detect a difference in changes of vibration characteristics of respective sensors divided by a position as a boundary where a failure considered to appear when the structure is abnormal is caused. As a result, comparison can be made with the frequency in which the influence of the phase has been removed, which enables accurate detection of an abnormality.

Figure 4:
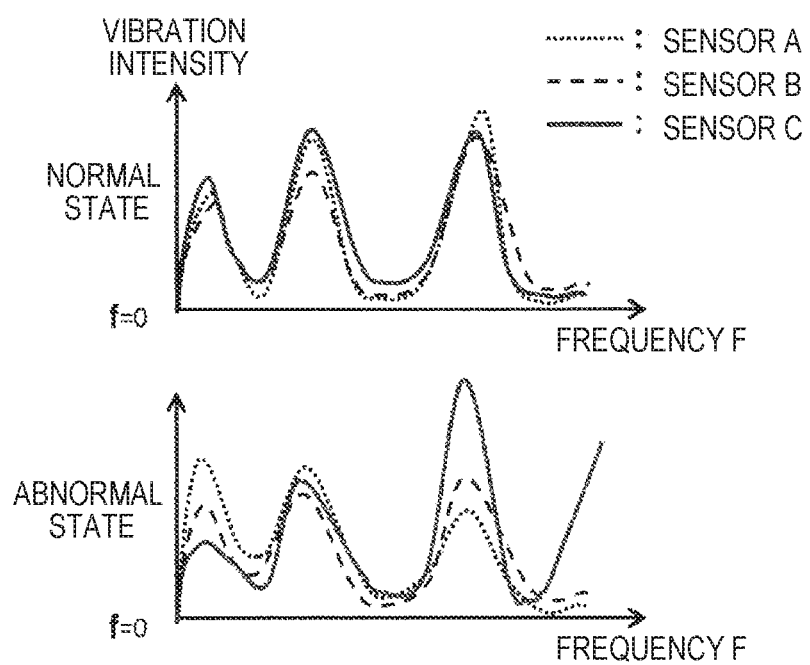
FIG. 4 is a graph illustrating a relationship between a frequency and a vibration intensity in the first example embodiment.

In FIG. 3, a correlation is established among the sensors A, B, and C when the bridge 20 is normal. When an abnormality is detected at the position of the sensor C, while a correlation is established between the sensor A and the sensor B, no correlation is established with respect to the sensor C. FIG. 4 illustrates this situation using a graph. In this case, a crack 25 (FIG. 3) occurs in a position of the sensor C.

FIG. 4 is a graph illustrating a relationship between a frequency and a vibration intensity by using data of a particular period after the vehicle passes by the position of the sensor A until the vehicle passes by the point of the sensor C. It can be seen from the graph that, while there is a correlation among the sensors A, B, and C in the normal state, the inspection value of the sensor C deviates from the correlation in the abnormal state.

After the position where the abnormality has been found is repaired, the correlation in a normal state is updated to repaired data, namely, to the correlation in a normal state.

The "temporal data" will now be described. The temporal data is a data series measured at different times. The temporal data may be data measured continuously (at dense time intervals) or may be data measured discontinuously. Further, the measurement interval is not necessarily required to be regular intervals.

Since the correlation is determined by only the values of respective sensors at the same time, the measuring items may not necessarily be required to be the same. Not all the values of respective sensors may be a displacement, or not all the values of respective sensors may be a vibration acceleration, but the values of the sensors may be data in which multiple measuring items are mixed. For example, abnormality detection is possible by using data of a different period from the modelled period.

Further, with a use of probability distribution model, a correlation established among data of the sensors can be defined at a probability at which data of the sensors is a predetermined value. When an inspection value which occurs at a low probability in the probability distribution model is obtained from the sensor, the inspection value can be regarded as deviating from the prediction inspection value, and the magnitude of the deviation can be replaced with an amount determined based on the reciprocal number of the probability. A use of the feature of this probability distribution model enables abnormal detection using the probability distribution model.

Second Example Embodiment

In a second example embodiment, the correlation of frequency conversion data for points where the vibration intensity in a natural frequency of each mode of normalized frequency conversion data is substantially the same, out of the frequency conversion data described in the first example embodiment, is modelled on a floorboard having the same vibration mode to detect an abnormality of a structure.

Also in the second example embodiment, it is preferable that the sensors be vibration sensors or displacement sensors. In a similar manner to the first example embodiment, an abnormality can be detected by observing a difference between the predicted value and a measurement value by using the generated model. When there appears a difference in changes of vibration characteristics of respective sensors divided by a position as a boundary where a failure that is considered to appear when the structure is abnormal is caused, an abnormality is detected.

Figure 5:
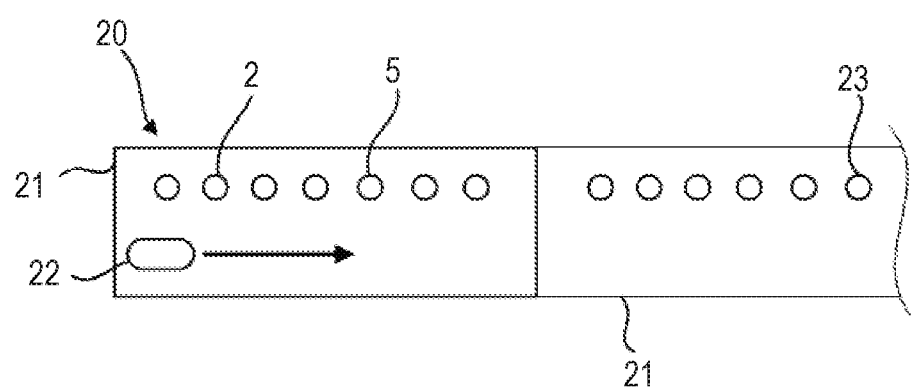
FIG. 5 is a schematic diagram illustrating a relationship among the road surface (floorboard) of a bridge, a vehicle traveling thereon, and sensors in a second example embodiment.

FIG. 5 is a schematic diagram illustrating a relationship among the road surface (floorboard) of a bridge, a vehicle traveling thereon, and sensors in the second example embodiment. In the model for a normal state, while a correlation is established between the sensor 5 and a sensor 23, no correlation is established between the sensor 2 and the sensor 5 and between the sensor 2 and the sensor 23. In this case, when an abnormality occurs at a position of the sensor 23, for example, the correlation between the sensor 5 and the sensor 23 is no longer established, which enables detection of an abnormality occurring. Note that, in FIG. 5, while a part of the floorboard 21 on the right side is not depicted and thus the sensor 23 is depicted near the right side of the floorboard 21, both the sensor 5 and the sensor 23 are provided at substantially the same position (around the center) of the floorboard 21 having substantially the same length in practice. Since the sensor 5 and the sensor 23 are located at substantially the same position and behave similarly, there is a correlation thereof.

In the second example embodiment, unlike the first example embodiment, it is possible to detect an abnormality by sampling only vibration data (inspection value) of a particular sensor without using all the vibration data of a plurality of sensors.

According to the second example embodiment, since only the relationship among sensors which behave similarly is modelled, this enables accurate model generation and accurate abnormality detection.

Third Example Embodiment

In a third example embodiment, a correlation in temporal data is utilized to detect an abnormality. A correlation among sensors is modelled from temporal data acquired by respective sensors, and the model and the measurement value are compared to detect an abnormality.

In the third example embodiment, when attenuation (reduction in the intensity) of a propagating signal or a change in the propagation speed that is considered to occur in an abnormal state is observed, the model and the measurement value are compared to determine a correlation degree and detect an abnormality.

Figure 6:
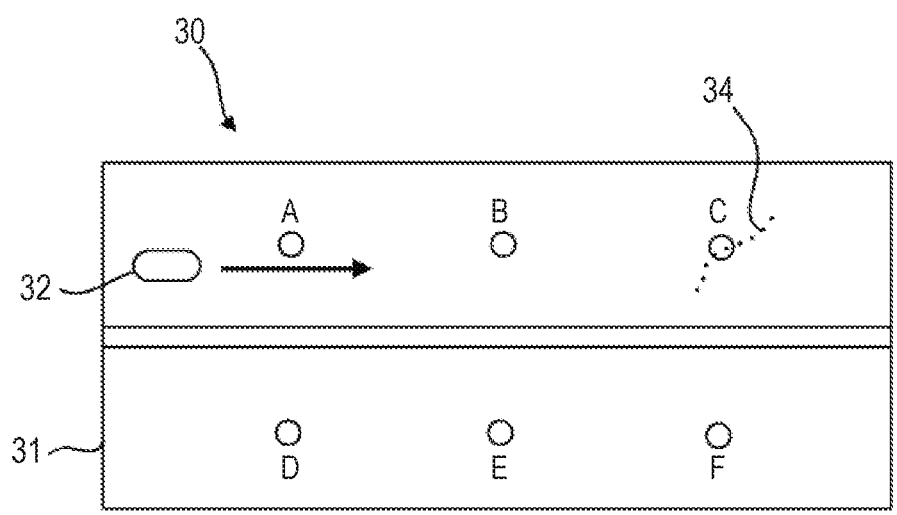
FIG. 6 is a schematic diagram illustrating a relationship among the road surface (floorboard) of a bridge, a vehicle traveling thereon, and sensors in a third example embodiment.

FIG. 6 is a schematic diagram illustrating a relationship among the road surface (floorboard) 31 of a bridge 30, a vehicle 32 traveling thereon, and sensors in the third example embodiment. In a similar manner to FIG. 4, it can be seen from the graph illustrated in FIG. 7 that, while a correlation is observed among the sensors A, B, and C in a normal state, the inspection value of the sensor C deviates from the correlation in an abnormal state. A crack 34 occurs in a position of the sensor C.

Figure 7:
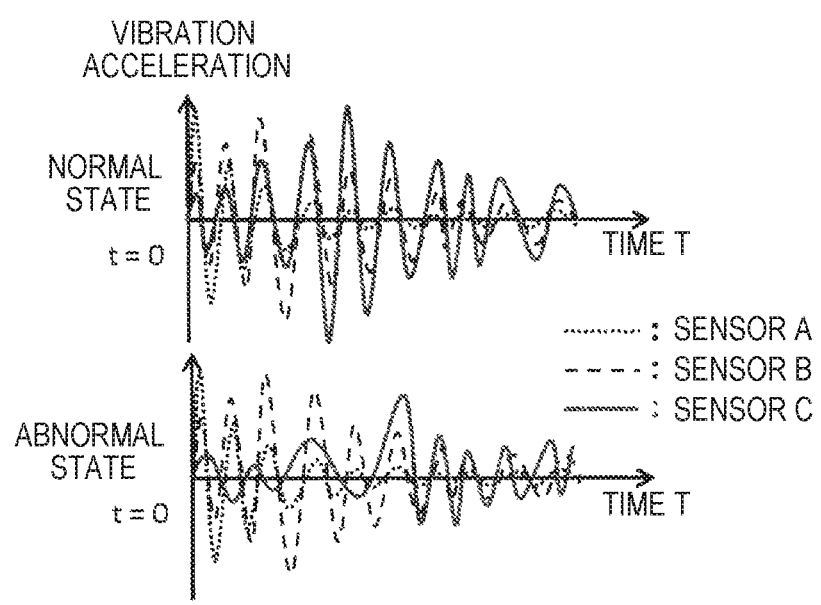
FIG. 7 is a graph illustrating a relationship between a vibration acceleration and time in the third example embodiment.

FIG. 7 is a graph illustrating a relationship between a vibration acceleration and time using data of period after a vehicle passes by the position of the sensor A until the vehicle passes by the point of the sensor C. Since no correlation is established at the inspection position of the sensor C, it can be seen that an abnormality (crack 34) occurs at the position of the sensor C.

According to the third example embodiment, unlike the first example embodiment, since the process of frequency conversion is unnecessary, fast processing is allowed.

Fourth Example Embodiment

In a fourth example embodiment, the abnormality detection method of the second example embodiment is performed on temporal data. Among points where the vibration intensities at a natural frequency of frequency conversion data normalized in advance are substantially the same (the difference is within a predetermined value), a correlation in the temporal data is used to generate a model and perform abnormal detection. In this case, compared to the second example embodiment, since the process of frequency conversion is unnecessary in the abnormality detection, fast processing is allowed.

While preferred example embodiments have been described above in the present invention, the present invention is not limited to these example embodiments, and various modifications and changes are possible within the concept thereof. For example, while a traveling vehicle is a vibration source in acquisition of vibration data of a bridge, other vibration sources than a vehicle may be used. Further, the sensors are not necessarily provided in regular intervals and may be provided at any intervals.

(Supplementary Note 1)

A structure abnormality detection system that detects an abnormality of at least one of structures classified into a plurality of groups in which a plurality of factors that may affect behavior of the structures are substantially the same, the structure abnormality detection system comprising:

a structure abnormality detection device that comprises
means for storing a model that predicts, from a first inspection value acquired at a first inspection position, a second inspection value acquired at a second inspection position that is a position where a vibration intensity in vibration of a predetermined vibration mode at a natural frequency of the structure is substantially the same as at the first inspection position, and
means for detecting an abnormality of the structure by evaluating fidelity of the first inspection value and the second inspection value acquired at a particular time to the model; and
a control unit that identifies that an abnormality occurs in a structure in the group by evaluating fidelity of an inspection value of a first structure and an inspection value of a second structure at a particular time to the model based on determination made by the structure abnormality detection device.

(Supplementary Note 2)

The structure abnormality detection system according to supplementary note 1, wherein the means for storing stores the model based on a correlation of frequency conversion data obtained by performing frequency conversion on the first inspection value and the second inspection value.

(Supplementary Note 3)

The structure abnormality detection system according to supplementary note 1, wherein the means for storing normalizes frequency conversion data obtained by performing frequency conversion on the first inspection value and the second inspection value and stores the model based on a correlation of the frequency conversion data in which the vibration intensity at the natural frequency is substantially the same.

(Supplementary Note 4)

A structure abnormality detection method for detecting an abnormality of at least one of structures classified into a plurality of groups in which a plurality of factors that may affect behavior of the structures are substantially the same, the structure abnormality detection method comprising steps of:

in a relation among all the normal structures in each of the groups, pre-storing a model for each of the groups that predicts an inspection value in a second structure from an inspection value in a first structure; and identifying an abnormality occurs in a structure in the group by evaluating fidelity of an inspection value in the first structure and an inspection value of the second structure at a particular time to the model.

(Supplementary Note 5)

The structure abnormality detection method according to supplementary note 4, wherein the step of storing stores the model based on a correlation of frequency conversion data obtained by performing frequency conversion on an inspection value in the first structure and an inspection value in the second structure.

(Supplementary Note 6)

The structure abnormality detection method according to supplementary note 4, wherein the step of storing normalizes frequency conversion data obtained by performing frequency conversion on an inspection value in the first structure and an inspection value in the second structure and stores the model based on a correlation of the frequency conversion data in which the vibration intensity at the natural frequency is substantially the same.

(Supplementary Note 7)

A storage medium storing a structure abnormality detection program that is able to cause at least a computer device to implement following functions and detects an abnormality of at least one of structures classified into a plurality of groups in which a plurality of factors that may affect behavior of the structures are substantially the same, the structure abnormality detection program comprising functions of:

in a relation among all the normal structures in each of the groups, based on vibration data obtained in at least one inspection position of the structure, pre-storing a model for each of the groups, wherein the model predicts, from a first inspection value acquired at a first inspection position, a second inspection value acquired at a second inspection position that is a position where a vibration intensity in vibration of a predetermined vibration mode at a natural frequency of the structure is substantially the same as at the first inspection position; and identifying an abnormality occurs in a structure in the group by evaluating fidelity of an inspection value in the first structure and an inspection value in the second structure at a particular time to the model.

(Supplementary Note 8)

The storage medium according to supplementary note 7, wherein the function of storing stores the model based on a correlation of frequency conversion data obtained by performing frequency conversion on the first inspection value and the second inspection value.

(Supplementary Note 9)

The storage medium according to supplementary note 7, wherein the function of storing normalizes frequency conversion data obtained by performing frequency conversion on an inspection value in the first structure and an inspection value in the second structure and stores the model based on a correlation of the frequency conversion data in which the vibration intensity at the natural frequency is substantially the same.

(Supplementary Note 10)

A structure abnormality detection system comprising:

sensors arranged in bridges to acquire vibration data, wherein the bridges are classified into a plurality of groups in which a plurality of factors that may affect behavior of structures are substantially the same;

storage that stores vibration data acquired by the sensors; and a structure abnormality detection device, wherein an abnormality of the bridges is detected in accordance with the vibration data at a plurality of positions of the bridges in the groups obtained by the sensors.

While the present invention has been described above with reference to the example embodiments (and modified embodiments), the present invention is not limited to the example embodiments (and modified embodiments) described above. Various changes that can be appreciated by those skilled in the art within the scope of the present invention may be applied to the configuration and the details of the present invention.

This application is based upon and claims the benefit of priority from Japanese Patent Application No. 2015-202076, filed on Oct. 13, 2015, the disclosure of which is incorporated herein in its entirety by reference.

The invention claimed is:

1. A structure abnormality detection system for detecting an abnormality of at least one of structures classified into a plurality of groups in which a plurality of factors that affect behavior of the structures are substantially the same, the structure abnormality detection system comprising:

a storage unit for storing a model that is created from a first inspection value acquired at a first inspection position;

a prediction inspection generation unit for predicting, from the first inspection value, a second inspection value acquired at a second inspection position that is a position where a vibration intensity in a predetermined vibration mode at a natural frequency of the structure is substantially the same as at the first inspection position;

a detection unit for detecting an abnormality of the structure by evaluating fidelity of the first inspection value and the second inspection value acquired at a particular time to the model; and a control unit for identifying that an abnormality occurs in a structure in the group by evaluating fidelity of an inspection value of the first structure and an inspection value in the second structure at a particular time to the model based on detection performed by the detection unit.

2. The structure abnormality detection system according to claim 1, wherein the storage unit stores the model based on a correlation of frequency conversion data obtained by performing frequency conversion on the first inspection value and the second inspection value.

3. The structure abnormality detection system according to claim 1, wherein the storage unit normalizes frequency conversion data obtained by performing frequency conversion on the first inspection value and the second inspection value and stores the model based on a correlation of the frequency conversion data in which the vibration intensity at the natural frequency is substantially the same.

4. A structure abnormality detection method for detecting an abnormality of at least one of structures classified into a plurality of groups in which a plurality of factors that affect behavior of the structures are substantially the same, the structure abnormality detection method comprising:

in a relation among all the normal structures in each of the groups, pre-storing a model in a storage unit for each of the groups, wherein the model predicts an inspection value in a second structure from an inspection value in a first structure; and identifying an abnormality occurs in a structure in the group by evaluating fidelity of an inspection value in the first structure and an inspection value in the second structure at a particular time to the model.

5. The structure abnormality detection method according to claim 4, wherein, in the storage unit, the model is stored based on a correlation of frequency conversion data obtained by performing frequency conversion on an inspection value in the first structure and an inspection value in the second structure.

6. The structure abnormality detection method according to claim 4, wherein in the storage unit, frequency conversion data obtained by performing frequency conversion on an inspection value in the first structure and an inspection value in the second structure is normalized, and the model is stored based on a correlation of the frequency conversion data in which the vibration intensity at the natural frequency is substantially the same.

7. A storage medium storing a structure abnormality detection program that is able to cause a computer device to implement following functions and detects an abnormality of at least one of structures classified into a plurality of groups in which a plurality of factors that affect behavior of the structures are substantially the same, the function comprising:

in a relation among all the normal structures in each of the groups each including a plurality of structures, based on vibration data obtained in at least one inspection position of the structure, pre-storing a model in a storage unit for each of the groups, wherein the model predicts, from a first inspection value acquired at a first inspection position, a second inspection value acquired at a second inspection position that is a position where a vibration intensity in vibration of a predetermined vibration mode at a natural frequency of the structure is substantially the same as at the first inspection position; and identifying an abnormality occurs in a structure in the group by evaluating fidelity of an inspection value of the first structure and an inspection value of the second structure at a particular time to the model.

8. The storage medium according to claim 7, wherein, in the storage unit, the model is stored based on a correlation of frequency conversion data obtained by performing frequency conversion on the first inspection value and the second inspection value.

9. The storage medium according to claim 7, wherein, in the storage unit, frequency conversion data obtained by performing frequency conversion on an inspection value in the first structure and an inspection value in the second structure is normalized, and the model is stored based on a correlation of the frequency conversion data in which the vibration intensity at the natural frequency is substantially the same.

10. The structure abnormality detection system according to claim 1 further comprising:
sensors arranged in bridges to acquire vibration data, wherein the bridges are classified into a plurality of groups; and
storage for storing vibration data acquired by the sensors,
wherein an abnormality of the bridges is detected in accordance with the vibration data at a plurality of positions of the bridges in the groups obtained by the sensors.

* * * * *

UNITED STATES PATENT AND TRADEMARK OFFICE
CERTIFICATE OF CORRECTION

PATENT NO. : 10,641,681 B2
APPLICATION NO. : 15/767881
DATED : May 5, 2020
INVENTOR(S) : Ryota Mase and Katsuhiro Ochiai Page 1 of 1

It is certified that error appears in the above-identified patent and that said Letters Patent is hereby corrected as shown below:

In the Specification

Column 4, Description of Embodiments, Line 54; After second "unit", insert --14--

Column 5, Description of Embodiments, Line 1; After "sensor", insert --16--

Column 6, Description of Embodiments, Line 63; After "vehicle", insert --22--

Signed and Sealed this
Seventeenth Day of November, 2020

Andrei Iancu
*Director of the United States Patent and Trademark Office*